(12) United States Patent
Eguchi

(10) Patent No.: US 8,164,794 B2
(45) Date of Patent: Apr. 24, 2012

(54) IMAGE-FORMING APPARATUS AND METHOD FOR ADJUSTING TOTAL AMOUNT OF TONER IN TRAP

(75) Inventor: Kimimori Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/104,337

(22) Filed: May 10, 2011

(65) Prior Publication Data

US 2011/0211209 A1 Sep. 1, 2011

Related U.S. Application Data

(62) Division of application No. 11/956,867, filed on Dec. 14, 2007, now Pat. No. 7,961,354.

(30) Foreign Application Priority Data

Dec. 18, 2006 (JP) .................................. 2006-339955
Nov. 15, 2007 (JP) .................................. 2007-297267

(51) Int. Cl.
*H04N 1/40* (2006.01)
(52) U.S. Cl. ........................................ 358/2.1; 358/3.14
(58) Field of Classification Search .................... 358/1.9, 358/2.1, 3.27, 3.14–3.15; 382/162–167
See application file for complete search history.

(56) References Cited

U.S. PATENT DOCUMENTS

| 5,841,955 A | 11/1998 | Wang |
| 6,798,540 B1 | 9/2004 | Kritayakirana et al. |
| 7,710,609 B2 | 5/2010 | McElvain |
| 2005/0068553 A1 | 3/2005 | Otake et al. |

FOREIGN PATENT DOCUMENTS

JP 2005-161580 A 6/2005

*Primary Examiner* — Thomas D Lee
*Assistant Examiner* — Stephen M Brinich
(74) *Attorney, Agent, or Firm* — Fitzpatrick, Cella, Harper & Scinto

(57) ABSTRACT

The present invention provides an image-forming apparatus capable of reducing the amount of toner at a position at which the trapping is carried out. The apparatus has an image-deformation processing unit where input image data is processed to deform the image shape or the trapping or overprinting is carried out on the respective color plates. The apparatus determines whether or not the trapping should be carried out to the target pixels on the boundary between color plates in the adjacent different objects, determines the color plate having the trap color, obtains the amount of toner of the trap color, determines based on the amount of toner of the trap color and the target pixels whether or not the total amount of toner of the trap exceeds the limit value, and reduces the total amount of toner if the total amount of toner of the trap exceeds the limit value.

7 Claims, 13 Drawing Sheets

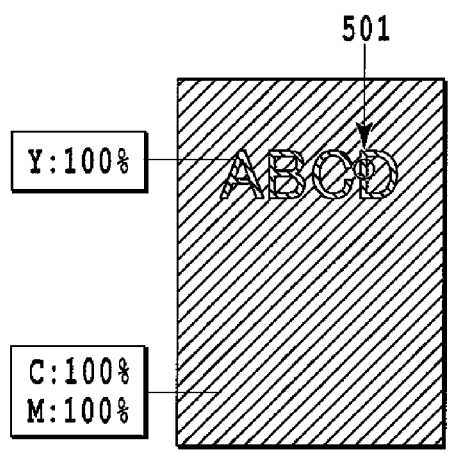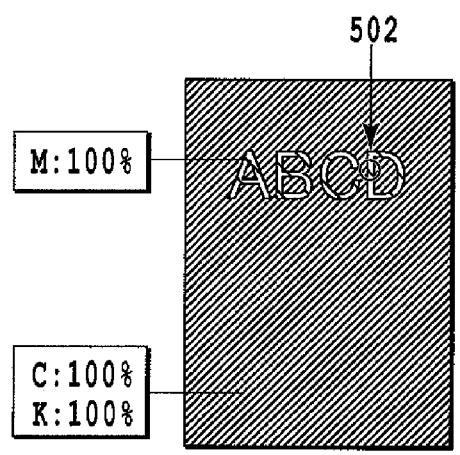
FIG.5A  FIG.5B

THE AMOUNT OF
TONER OF K PLATE

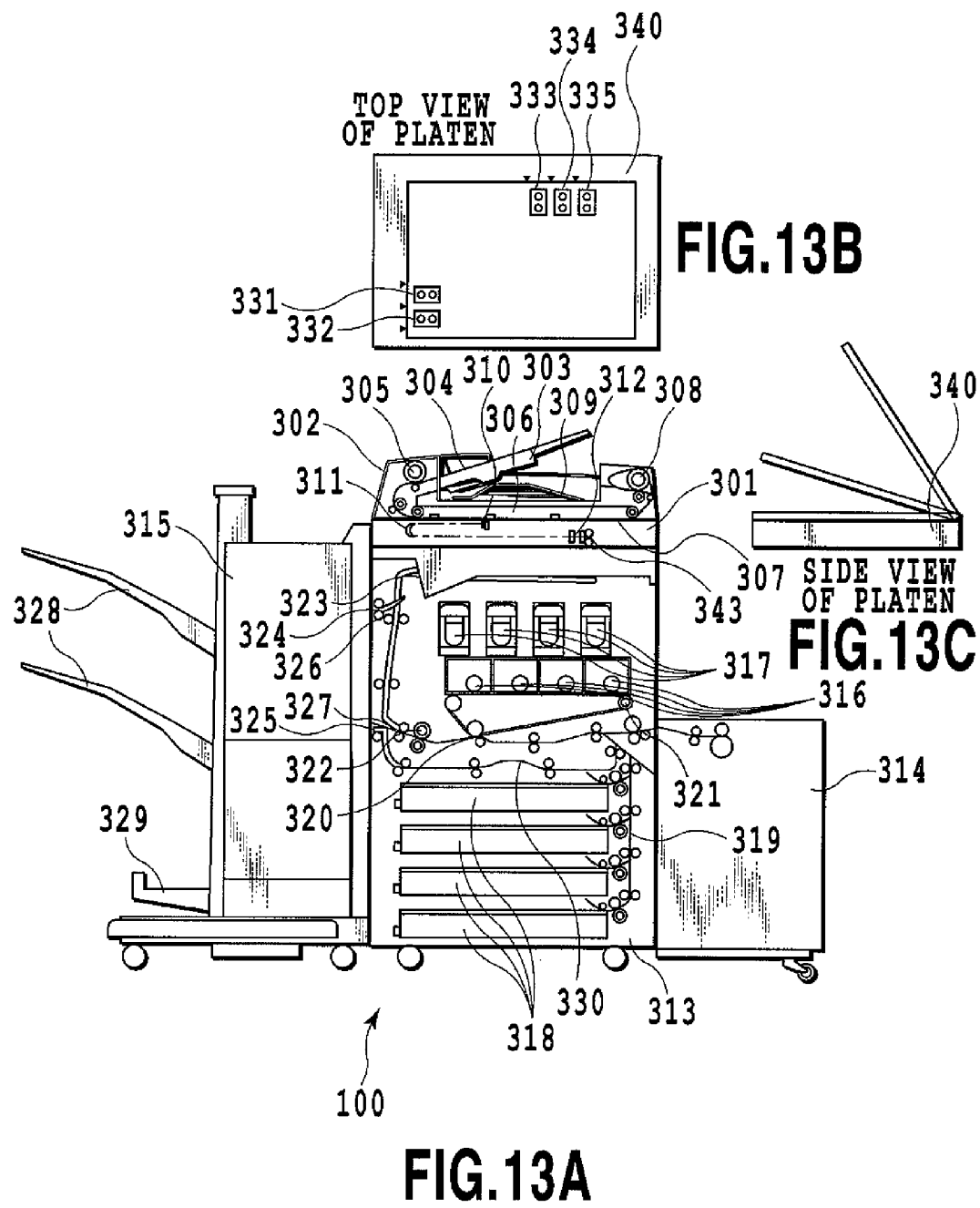

IMAGE-FORMING APPARATUS AND METHOD FOR ADJUSTING TOTAL AMOUNT OF TONER IN TRAP

This application is a divisional of U.S. patent application Ser. No. 11/956,867, filed Dec. 14, 2007.

BACKGROUND OF THE INVENTION

Field of the Invention

The present invention relates to techniques for adjusting the total amount of toner in a color print.

"Trapping" refers to a process where a somewhat overlapped portion (hereinafter referred to as a trap) is provided at a boundary between two adjacent objects different in color for the purpose of preventing poor printing alignment from occurring. Accordingly, the total amount of toner in the trap may often exceed a limit value of the amount of toner which has been preliminarily set up in a printer or a printer unit in a printing product such as a copying machine. The total amount of toner corresponds to the sum of pixel values (the amount of toner) of the respective pixels in the respective color plates and a unit thereof is represented by percent (%). If the total amount of toner exceeds the limit value, the toner may scatter in the trap, and as a result, there may be a problem of deterioration of image quality. To avoid such a problem, it is necessary to adjust the total amount of toner so as not to exceed the limit value.

One example of a method for adjusting the total amount of toner is disclosed, for example, in Japanese Patent Laid-Open No. 2005-161580. This method will be briefly described below.

FIGS. 5 and 7 illustrate the conventional mechanism for reducing the total amount of toner.

Reference numeral 701 in FIG. 7 shows an enlarged view of 501 in FIG. 5A. Reference numeral 701 shows a state before the trapping is carried out in adjacent two objects. Reference numeral 702 shows a state after the trapping has been carried out in the adjacent two objects. Reference numeral 703 shows a state where the total amount of toner has been reduced in the trap. As seen from 702, the total amount of toner in the trap before trapping is 300% (C plate: 100%, M plate: 100%, Y plate: 100%, and K plate: 0%). C, M, Y and K represent cyan, magenta, yellow and black, respectively. If the limit value of the amount of toner is 200%, the total amount of toner in the trap exceeds the limit value of the amount of toner. Accordingly, in this method, as shown in 703, the total amount of toner in the trap is reduced by carrying out UCR (Under Color Removal). Namely, according to this method, while the amount of toner in the C plate, the M plate and the Y plate are respectively reduced, the amount of toner in the K plate is newly added. Thereby, the total amount of toner in the trap is reduced from 300% to 200% (the C plate: 50%, the M plate: 50%, the Y plate: 50%, and the K plate: 50%) while maintaining brightness of the trap.

FIGS. 8A and 8B illustrate the constitution of the color plates before and after the reduction of the total amount of toner, respectively.

As shown by reference numeral 801 in FIG. 8A, the constitution of the amount of toner in the respective color plates before the reduction of the total amount of toner is 100% in the C plate, 100% in the M plate, and 100% in the Y plate. By executing UCR, the constitution of the amount of toner in the respective color plates becomes 50% in the C plate, 50% in the M plate, 50% in the Y plate, and 50% in the K plate.

On the other hand, Reference numeral 704 shows an enlarged view of 502 in FIG. 5B. Reference numeral 704 shows a state before trapping the adjacent two objects. Reference numeral 705 shows a state after trapping the adjacent two objects. Reference numeral 706 shows a state where the total amount of toner has been reduced in the trap. As apparent from 705, the total amount of toner in the trap before trapping is 300% (the C plate: 100%, the M plate: 100%, the Y plate: 0%, and the K plate: 100%). If the limit value of the total amount of toner is 200%, the total amount of toner in the trap exceeds the limit value of the total amount of toner. Accordingly, in this method, as shown 706, by reducing the total amount of toner of the C plate and the M plate, respectively, the total amount of toner in the trap is reduced from 300% to 200% (the C plate: 50%, the M plate: 50%, the Y plate: 0%, and the K plate: 100%).

As shown in 802 of FIG. 8B, the constitution of the amount of toner in the respective color plates before the reduction of the total amount of toner is 100% in the C plate, 100% in the M plate, and 100% in the K plate. The constitution of the amount of toner in the respective color plates becomes 50% in the C plate, 50% in the M plate, and 100% in the K plate by reducing the amount of toner in the C plate and the M plate.

There are, however, two problems to be solved in the above-mentioned conventional technique A first problem is that, as shown in 703, the K plate is newly added to the trap.

A second problem is that, as shown in 704, the amount of toner in the trap color is lower than a desired amount of toner.

In this regard, also in a portion where an over printing is executed, that is, a surrounding color plate creeps into the K plate, the same problem as mentioned above may occur.

The first problem will be explained below more concretely.

As shown by 701 in FIG. 7, the color plates of the left-side object is constituted by the C plate (100%) and the M plate (100%), while the color plate of the right-side object is the Y plate (100%). The trapping is carried out, as shown by 702 in FIG. 7, so that the right-side object is overlapped with the left-side object. In this case, since the trap color is of the color plate in the right-side object; that is, the Y plate (100%); the color plates of the trap are formed of the C plate (100%), the M plate (100%) and the Y plate (100%). As a result, the total amount of toner in the trap becomes 300% after the trapping. In this regard, generally, as shown by 702 in FIG. 7, the trapping is carried out so that the object formed of the C plate and M plate having a large total amount of toner is overlapped with another object formed of the color plates except for the C and M plates.

In electronic photography, the limit value of the total amount of toner is preset as described above by taking into consideration the fact that fixed toner comes off If the limit value of the total amount of toner is 200%, the total amount of toner (300%) in the trap exceeds the limit value. Accordingly, the total amount of toner need to be lowered to the limit value by executing the conventional process for reducing the total amount of toner (hereinafter referred to as "toner reduction"). When the toner reduction is carried out, the total amount of toner in the trap is reduced to 200%. The constitution of the color plates at that time is 50% in the C plate, 50% in the M plate, 50% in the Y plate, and 50% in the K plate. As shown in FIG. 6, the toner reduction utilizes the nature in that color and brightness of the overlapped portion of the C, M and Y plates having a same amount of toner are the same as those of the K plate having the same amount of toner as the former. By replacing 50% of a respective amount of toner (100%) in the C, M and Y plates with the K plate (50%) utilizing the toner reduction, it is possible to reduce the total amount of toner in the trap from 300% to 200%. However, since the K plate is a color plate not originally existing, there is a problem when the K plate is out of alignment in that the K plate not originally existing appears around the trap.

Next, the second problem will be described below more concretely.

As shown by 704 in FIG. 7, the color plate of the left-side object is formed of the C plate (100%) and the K plate (100%), and the color plate of the right-side object is the M plate (100%). The trapping is carried out so that the right-side object overlaps with the left-side object, as shown in 705. In this case, since the trap color is the color plate of the right-side object; i.e. the M plate (100%), the color plate of the trap is formed of the C plate (100%), the K plate (100%) and the M plate (100%). That is, the total amount of toner of the trap after the trapping becomes 300%.

As mentioned above, in the electronic photography, the limit value of the total amount of toner is predetermined. If the limit value of the total amount of toner is 200%, the total amount of toner of 300% exceeds the limit value. Accordingly, the toner reduction is carried out to lower the total amount of toner to the limit value. By the toner reduction, the total amount of toner in the trap reduces to 200%. The constitution of the color plate at that time is 50% in the C plate, 50% in the M plate and 100% in the K plate. While the total amount of toner in the M plate forming the trap color was originally 100%, it is reduced to 50% after the toner reduction, whereby the amount of toner of the trap color becomes less than a desired amount of toner. The purpose of the trapping is to make the poor printing alignment less noticeable even if the poor printing alignment occurs. Therefore, when the amount of toner in the M plate becomes 50%, the effect of the trapping becomes insufficient in the case of the poor printing alignment.

SUMMARY OF THE INVENTION

An apparatus according to the present invention comprises a component inputting an image, a component carrying out trapping of target pixels in a boundary between color plates in different objects adjacent to each other, a component determining whether or not the total amount of toner exceeds a limit value at a position where the trapping has been carried out, a component reducing the total amount of toner in accordance with the amount of toner or brightness of the target pixels if it is determined that the total amount of toner exceeds the limit value, and a component forming a trapping-processed image on a recording sheet.

A method according to the present invention comprises inputting an image, carrying out the trapping of target pixels in a boundary between color plates in different object adjacent to each other, determining whether or not the total amount of toner exceeds a limit value at a position where the trapping has been carried out, reducing the total amount of toner in accordance with the amount of toner or brightness of the target pixels if it is determined that the total amount of toner exceeds the limit value, and forming a trapping-processed image on a recording sheet.

A computer-readable recording medium according to the present invention has computer-executable instructions comprising inputting an image, carrying out trapping of target pixels in a boundary between color plates in different object adjacent to each other, determining whether or not the total amount of toner exceeds a limit value at a position where the trapping has been carried out, reducing the total amount of toner in accordance with the amount of toner or brightness of the target pixels if it is determined that the total amount of toner exceeds the limit value, and forming a trapping-processed image on a recording sheet.

According to the present invention, it is possible to eliminate the problems in the conventional technique that the K plate newly appears in the trap and the amount of toner of the trap color becomes less than the desired value.

Also, according to the present invention, since the total amount of toner is adjustable to an optimum amount in accordance with the brightness or the densities of the pixels, the image quality does not deteriorate in the trap.

Further, the present invention is applicable either to a portion where an over-printing has been carried out or to a portion where the trapping has not been carried out.

The above and other objects, effects, features and advantages of the present invention will become more apparent from the following description of embodiments thereof taken in conjunction with the accompanying drawing.

BRIEF DESCRIPTION OF THE DRAWINGS

FIG. 5A illustrates the conventional mechanism for reducing the total amount of toner;

FIG. 5B illustrates the conventional mechanism for reducing the total amount of toner;

FIG. 13A illustrates a structure of the image-forming apparatus according to one embodiment of the present invention;

FIG. 13B illustrates a top view of a platen of the image-forming apparatus; and

FIG. 13C illustrates a side view of a platen of the image-forming apparatus.

DESCRIPTION OF THE EMBODIMENTS

Figure 1:
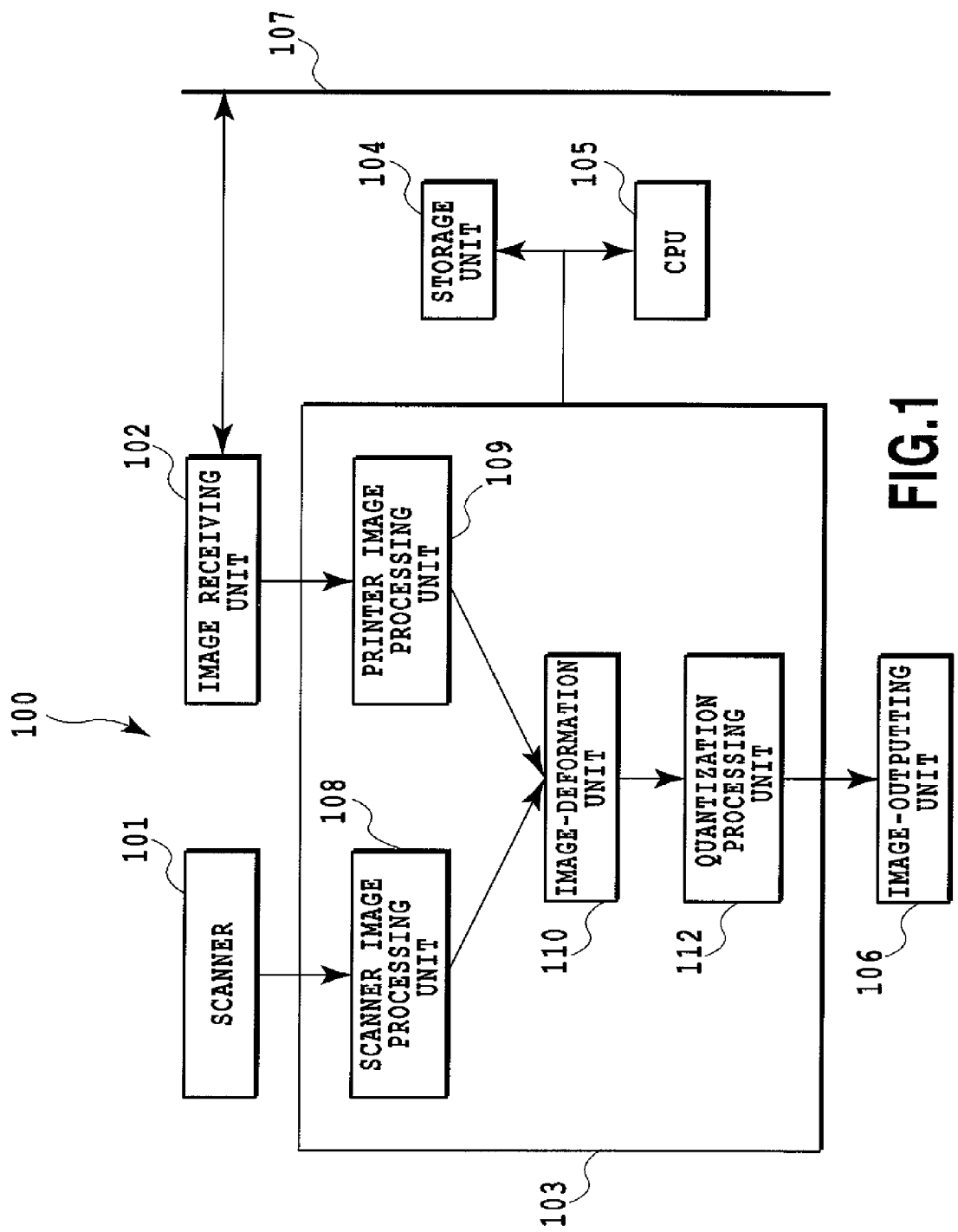
FIG. 1 is a block diagram illustrating an example of an image-forming apparatus according to an embodiment of the present invention.

An embodiment of the present invention will be described in detail below with reference to the attached drawings.

An image-forming apparatus according to one embodiment of the present invention is a copying machine such as a Multifunction Peripheral (MFP). Besides the copying machine, it may be any other printing devices device, such as a color printer.

First, the structure of the image-forming apparatus will be described with reference to the drawing.

FIG. 1 is a block diagram illustrating an example of the image-forming apparatus 100.

The image-forming apparatus 100 comprises a scanner 101, an image receiving unit 102, an image processing unit 103, a storage unit 104, CPU 105 and an image outputting unit 106. The image processing unit 103 comprises a scanner image processing unit 108, a printing image processing unit 109, and an image-deformation processing unit 110. The image-forming apparatus 100 is also connectable via a network 107 such as LAN or the Internet to external equipments such as at least one server for managing image data or at least one personal computer (PC) for instructing various image-forming apparatuses to execute printing.

The functions of the above-mentioned components forming the image-forming apparatus 100 will be described.

The scanner 101 outputs an input image (for example, RGB color signals) to the scanner image processing unit 108. The scanner image processing unit 108 carries out the image processing on the received RGB color signals, such as the shading correction, the image area separating process or the color conversion.

The image receiving unit 102 outputs PDL data received from the external equipment to the printing image processing unit 109. The printing image processing unit 109 interprets a group of commands contained in the received PDL data and outputs intermediate codes.

The printing image processing unit 109 converts the intermediate codes to bit-mapped images by using a built-in RIP (Raster Image Processor). Further, the printing image processing unit 109 generates attribute information based on the attribute of the group of commands contained in the PDL data.

The image deformation processing unit 110 carries out the process for converting the image data received from the printing image processing unit 109 to change a shape of the image and/or carries out a distinct process such as the trapping or the overprinting according to this embodiment on the respective color plates.

The quantization processing unit 112 carries out the dithering process and such.

Next, the configurations and functions of the storage unit 104, CPU 105 and the image outputting unit 106 will be described.

The storage unit 104 comprises RAM, ROM or others. CPU 105 executes various processing operations in accordance with programs stored in ROM. The image outputting unit 106 outputs the image on the recording sheet. That is, the image outputting unit 106 forms the image on the recording sheet.

Generally, the processes different in the respective color plates, such as the trapping or the over-printing, are carried out in two ways; one executed in the object data base within RIP, and the other executed for the bit map after the rendering. This embodiment may be applicable to both processes.

Next, the structure of the image-forming apparatus 100 will be described with reference to the drawing.

FIG. 13A illustrates the structures of the scanner 101, the image receiving unit 102 and the image outputting unit 106 of the image-forming apparatus 100. FIGS. 13B and 13C illustrate drawings of a top view and a side view, respectively, of a platen installed in the image-forming apparatus 100, together with a structural drawing of the image-forming apparatus 100.

The image-forming apparatus 100 is a Multifunction Peripheral (MFP) having functions of copying, printing and FAX.

The image-forming apparatus 100 comprises a scanner 301, a document feeder 302, a printer 313 provided with four-color drums for printing, a paper feeding deck 314, a finisher 315 or others.

The operation for reading a manuscript by the scanner 301 will be described below.

First, the operation for reading the manuscript placed on the platen 307 will be described.

A user places the manuscript on the platen 307 and closes the document feeder 302. When a sensor 340 for sensing the opening and closing of the document feeder 302 detects that the platen has been closed, manuscript size detecting sensors of a reflective type 331 to 335 detect the size of the manuscript. When the manuscript size has been detected, a light source 310 irradiates the manuscript. CCD 343 receives the light reflected by the manuscript via a reflector 311 and a lens 312 to obtain image signals. A controller (not shown) converts the image signals obtained by CCD 343 to digital image data. Then, the controller carries out a desired image process on the digital image data to generate image data to be printed. Next, the controller once stores the image data to be printed into a memory within the controller.

The operation for reading the manuscript placed in the document feeder 302 will now be described.

The user places the manuscript in a face-up manner on a tray of a manuscript setting unit 303. When a sensor 304 for sensing whether the manuscript exists on the document feeder 302 detects that the manuscript has been set on the document feeder 302, a paper feed roller 305 and a conveyor belt 306 are made to rotate, whereby the manuscript is conveyed to a predetermined position on the platen 307. Then, the same operation as described before for reading the manuscript placed on the platen 307 is carried out, and the image data is once stored in the memory within the controller.

When the reading of the manuscript is completed, the conveyor belt 306 starts to rotate again. Thereby, the manuscript placed on the platen 307 is conveyed via a conveyor roller 308 placed in a paper ejection side to a paper ejection tray 309 and is discharged outside.

When a plurality of manuscripts exist, simultaneously with the conveyance of the manuscripts existing on the platen 307 to the paper ejection tray 309, another manuscript is conveyed via the paper feed roller 305 to the predetermined position on the platen 307 and read as described above.

Next, the printing operation of the printer 313 will be described.

The image data to be printed once stored in the memory of the controller is transmitted to the printer 313. A laser unit in the printer 313 converts the image data to be printed to four color laser beams of yellow, magenta, cyan and black, which are irradiated to photosensitive drums 316 of the respective colors. Thereby, electrostatic latent images are formed on the respective photosensitive drums 316. Then, the printer 313 develops the electrostatic latent images formed on the respective photosensitive drums 316 using toner supplied from the toner cartridges 317 to be visible. The visible image formed on the respective photosensitive drum is primarily transferred to an intermediate transfer belt 321. When a recording sheet conveyed from a paper cassette 318 or the paper feeding deck 314 via a paper feeding conveying path 319 reaches a secondary transfer position 320, the image transferred to the intermediate transfer belt 321 is further transferred to the recording sheet. If a fixer 322 applies physical pressure and heat to the recording sheet on which the image is transferred, the toner is fixed on the recording sheet. Then, the recording sheet is conveyed via a paper ejection conveying path to a face-down type center tray 323, an ejection port 324 toward the finisher 315 or a face-up type side tray 325. Note the side tray 325 is an ejection port available only when the finisher 315 is not equipped. Flappers 326 and 327 switch the conveying paths to switch these ejection ports.

When both side printing is executed, since the flapper 327 switches the conveying paths when the recording sheet passes the fixer 322, the recording sheet is conveyed again to the secondary transfer position 320 via a conveying path 330 for both side printing.

Next, the operation of the finisher 315 will be described.

The finisher 315 executes post processing of recording sheet on which the printing has been completed in accordance with the setting by the user. Concretely, a stapling (one or two positional stapling), a punching (two or three holes) or a saddle stitching is carried out.

The image-forming apparatus 100 is provided with two paper ejection trays 328. The paper ejection trays 328 for the recording sheet passing through the ejection port 324 toward the finisher 315 are switched in accordance with the setting by the user (for example, copying, printing or FAX).

A print engine is a print engine for four color drums, a print engine for one color drum or a print engine for monochrome printing. The image-forming apparatus 100 may be settable to carry out the monochrome printing or the color printing, to select the paper size, to carry out either one of the 2UP, 4UP or N-UP printing, and/or to carry out the both side printing, the stapling, the punching, the saddle stitching, the lamination printing, the front cover printing, and/or the back cover printing.

A first embodiment of a process for reducing the total amount of toner will be described with reference to the attached drawing.

Figure 2:
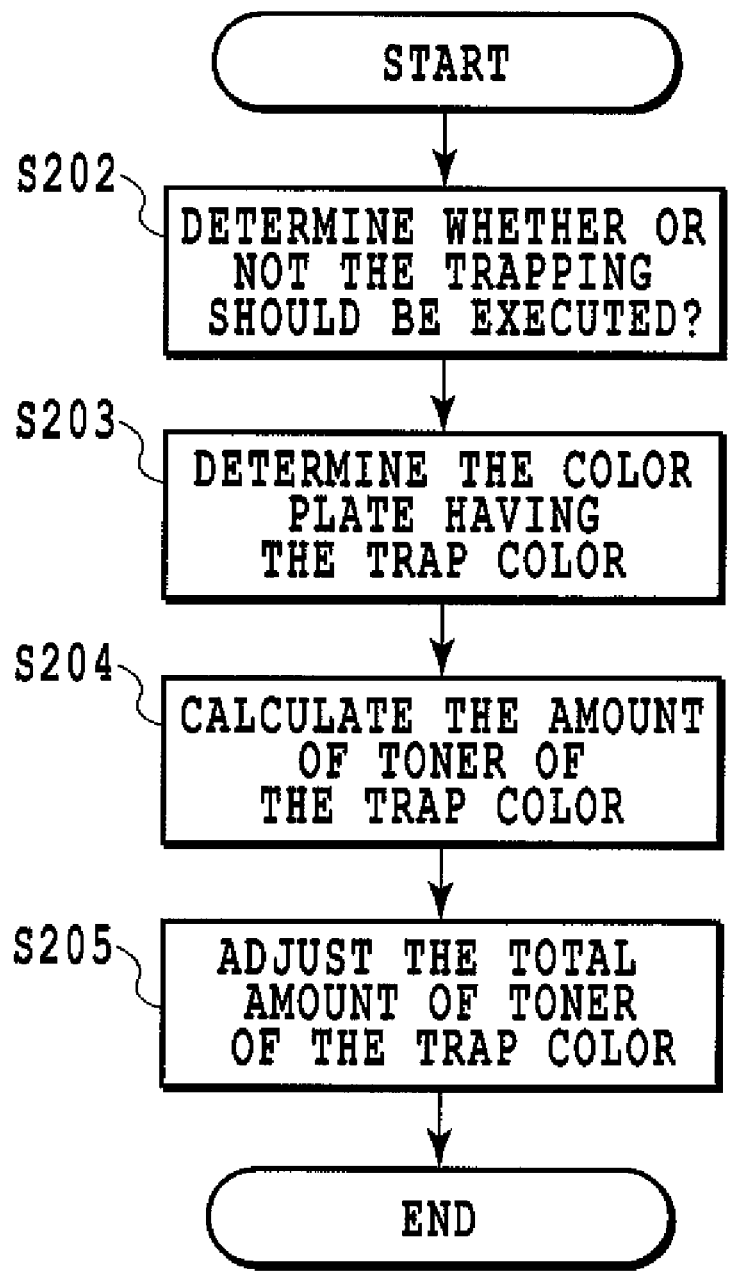
FIG. 2 is a flowchart illustrating the process for reducing the total amount of toner according to the embodiment.

FIG. 2 is a flowchart illustrating the process of reducing the total amount of toner according to the first embodiment.

The process is executed by the image-deformation processing unit 110 in the image-forming apparatus 100. In this regard, while the process may be carried out on image data read by the scanner 301 or those after RIP, it may be carried out on the intermediate data before RIP.

At S202, the image-deformation processing unit 110 determines whether or not the trapping is to be carried out on target pixels on the boundary between the color plates in the adjacent different objects. The trapping is executed on a pixel to pixel basis.

At S203, the image-deformation processing unit 110 determines the color plate that should be the trap color.

At S204, the image-deformation processing unit 110 calculates the amount of toner of the trap color.

At S205, the image-deformation processing unit 110 determines whether or not the total amount of toner in the trap exceeds the limit value on the basis of the amount of toner in the trap color and the amount of toner in the target pixels, and carries out the process for reducing the total amount of toner if the total amount of toner in the trap exceeds the limit value.

Finally, the image outputting unit 106 forms a trapping-processed image on the recording sheet.

The total amount of toner in the trap is reduced by the completion of the above-mentioned processes by the image-deformation processing unit 110.

Figure 10:
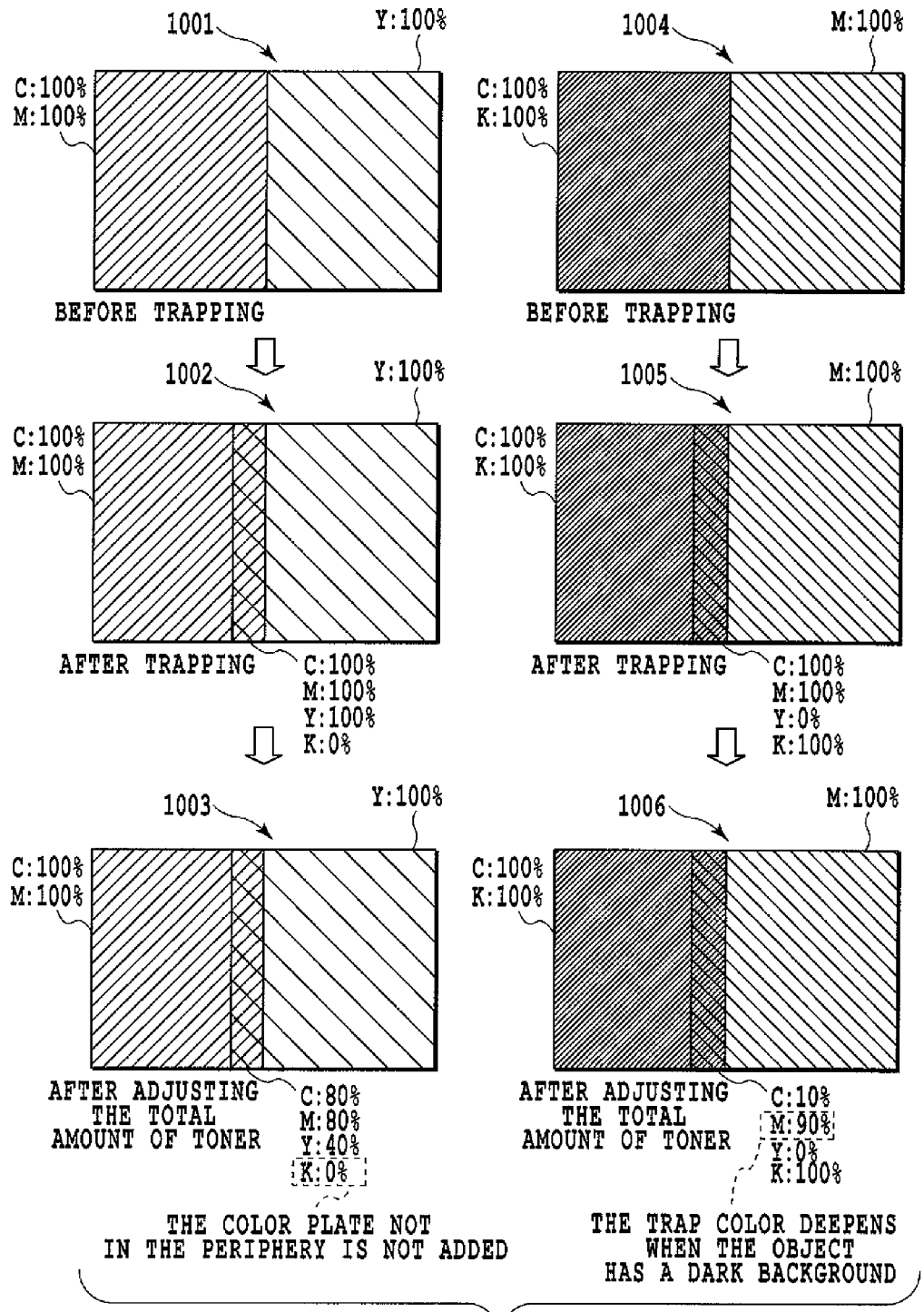
FIG. 10 illustrates a method for reducing the total amount of toner according to the embodiment of the present invention.

FIG. 10 illustrates the mechanism for reducing the total amount of toner according to the first embodiment.

Reference numeral 1001 in FIG. 10 shows illustrates the enlarged view of 501 in FIG. 5A. Reference numeral 1001 shows a state before the trapping is executed on the adjacent two objects. Reference numeral 1002 shows the information after the trapping has been executed on the two objects. Reference numeral 1003 shows a state where the total amount of toner in the trap has been reduced by using the method according to the first embodiment.

As shown by 1001, the color plate of the left-side object is formed of the C plate (100%) and the M plate (100%), while the color plate of the right-side object is formed of the Y plate (100%).

The image-deformation processing unit 110 determines whether or not the trapping is executed on the target pixels on the boundary between the color plates in the adjacent different objects (S202). In the first embodiment, the left-side object and the right-side object do not have the common color plate. Accordingly, if the trapping is not carried out, a white line may generate between the left-side object containing the C and M plates and the right-side object containing the Y plate when the Y plate is out of alignment rightward. Accordingly, the image-deformation processing unit 110 determines that the trapping should be executed.

The image-deformation processing unit 110 carries out the selection of the color plate which should be the trap color (S203). It is assumed that the trap color is a color plate expect for the K plate of the adjacent objects, which is one of the color plates containing the C plate, the M plate, the Y plate and the K plate, and which the target pixels do not have. Since the total amount of toner of the color plates in the left-side object is 200% (the C plate: 100%, the M plate: 100%) while that in the right-side object is 100% (the Y plate: 100%), the Y plate is selected as the trap color.

If the amount of toner of the trap color is 100% (S204), the image-deformation processing unit 110 executes the trapping so that the right-side object overlaps with the left-side object as shown in 1002. At that time, the total amount of toner is 300% (the C plate: 100%, the M plate: 100% and the Y plate: 100%), and exceeds the limit value (200%). Accordingly, the total amount of toner of the trap is reduced to the limit value by using the following method (S205).

Since the C plate and the M plate are visually denser than the Y plate which is the trap color, the ratio of the reduction amounts of the toner in the C plate, the M plate and the Y plate is determined as follows:

C_reduce:M_reduce:Y_reduce=1:1:3 where C_reduce, M_reduce and Y_reduce represent the ratio of the reduction amount of the toner in the C plate, the M plate and the Y plate, respectively.

Namely, the amounts of toner of the C plate and the M plate are respectively reduced by 20%, and the amount of toner of the Y plate is reduced by 60%. As shown in 1003, the constitution of the color plates in the trap is 80% in the C plate, 80% in the M plate and 40% in the Y plate, whereby the total amount of toner in the trap is reduced from 300% to 200%.

There are two reasons why the amount of reduction of the Y plate which is the trap color is larger than those of the other color plates. First, since the Y plate is brighter than the other plates, the Y plate is unnoticeable. Accordingly, the deterioration of the image quality is less after the trapping if the poor printing alignment does not occur. Secondarily, even if the poor printing alignment occurs to generate the white line, the influence on the image quality is insignificant, because the difference is small between the brightness of the Y plate (40%) and the brightness (white) of the recording sheet resulting in making the change from white to yellow less noticeable.

On the other hand, reference numeral 1004 shows the enlarged view of 502 in FIG. 5B. Reference numeral 1004 shows a state before the trapping is carried out on the adjacent two objects. Reference numeral 1005 shows information after the trapping has been carried out on the two objects. Reference numeral 1006 shows a state where the total amount of toner in the trap has been reduced by the method according to the first embodiment.

As shown in 1004, the color plate in the left-side object is formed of the C plate (100%) and the K plate (100%), and the color plate in the right-side object is formed of the M plate (100%).

The image-deformation processing unit 110 determines whether or not the trapping is executed on the target pixels on the boundary between the adjacent color plates in the adjacent different objects (S202). In the first embodiment, the left-side object and the right-side object do not have the common color plate. Accordingly, if the trapping is not executed, the white line may generate between the left-side object formed of the C plate and the K plate and the right-side object formed of the M plate. Accordingly, the image-deformation processing unit 110 determines that the trapping should be carried out.

The image-deformation processing unit 110 selects the color plate to be the trap color (S203). It is assumed that the trap color is a color plate expect for the K plate of the adjacent objects, which is one of the color plates containing the C plate, the M plate, the Y plate and the K plate, and which the target pixels do not have. Since the total amount of toner of the color plate in the left-side object is 200% (the C plate: 100% and the K plate: 100%), while that of the color plate in the right-side object is 100% (the M plate: 100%), the M plate is selected as the trap color.

The image-deformation processing unit 110 determines the amount of toner of the trap color as 100% (S204), and carries out the trapping as shown in 1005 so that the right-side object is overlapped with the left-side object. At that time, the total amount of toner in the trap becomes 300% (100% in the C plate, 100% in the M plate and 100% in the K plate) and exceeds the limit value (200%) of the total amount of toner. Accordingly, the total amount of toner in the trap is reduced to the limit value by using the following method (S205).

A ratio of the reduction amount of the toner in the C plate, the M plate and the K plate is set as follows:

C_reduce:M_reduce:K_reduce=9:1:0 where C_reduce, M_reduce and K_reduce represent the amount of reduction of the toner in the C plate, the M plate and the K plate, respectively.

That is, the amount of toner in the C plate is reduced by 90%, and that in the M plate is reduced by 10%. The amount of toner in the K plate is not reduced at all. Thereby, as shown in 1006, the constitution of the color plate in the trap is 10% in the C plate, 90% in the M plate and 100% in the K plate. Thus, the total amount of toner in the trap reduces from 300% to 200%.

There are two reasons why the amount of reduction of toner in the M plate which is the trap color is less than that in other color plates other than the M plate (except for the K plate); that is, the C plate. A first reason is as follows:

The amount of toner of the K plate in the trap is 100%, resulting in the low brightness. Accordingly, if the poor printing alignment does not occur, the difference in brightness between the K plate (100%) and the K plate (100%)+trap color (100%) is small even if the amount of toner of the trap color is 100%. As a result, the deterioration of the image quality is less even after the trapping.

A second reason is in that since the M plate (90%) appears when the poor printing alignment occurs, the change from the M plate (100%) to M plate (90%) in the trap is low. Accordingly, the effect for the trapping after preventing the white line from generating is significant. Also, since the amount of reduction for the trap color is small, it is possible to prepare for the desired trap color.

With regard to the ratio of the toner reduction amount, the amount of reduction of toner for the trap color may be either determined in accordance with the L values obtained by the calculation of L*a*b value, or determined by using a look-up table.

A second embodiment of a process for reducing the total amount of toner will be described with reference to the attached drawings.

Figure 3A:
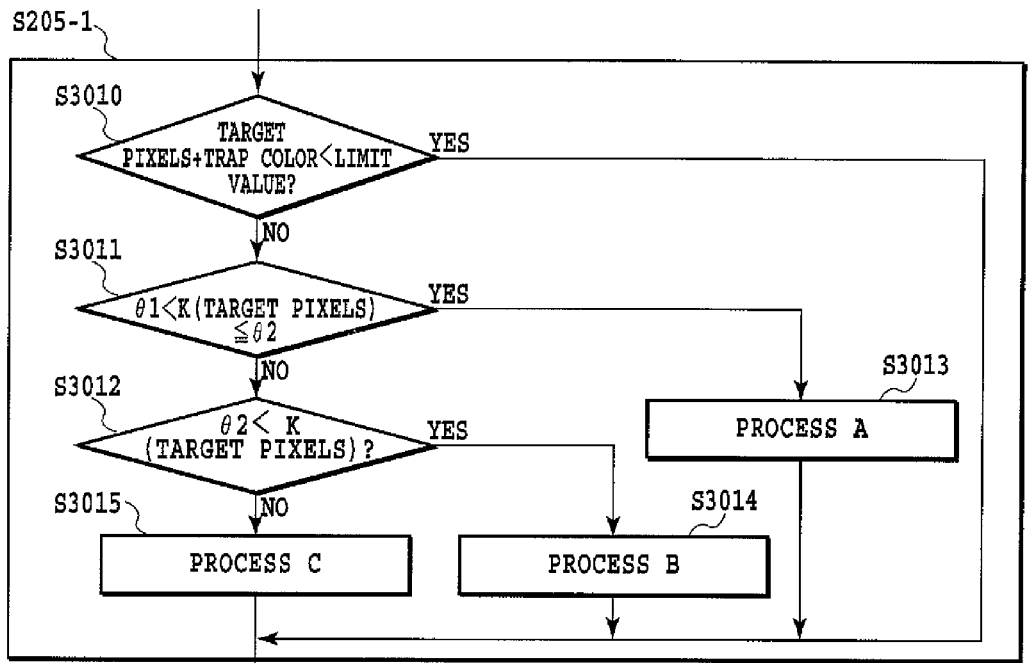
FIG. 3A is a flowchart illustrating in detail the process for adjusting the total amount of toner of the trap.

S205-1 in FIG. 3A shows a flowchart illustrating in detail the process (S205 in FIG. 2) for adjusting the total amount of toner in the trap.

At S3010, the image-deformation processing unit 110 determines whether or not the sum of the amount of toner of the trap color calculated at S204 and that of the target pixels exceeds the limit value of the total amount of toner. If the sum does not exceed the limit value, the process is finished. Contrarily, if the sum exceeds the limit value, the image-deformation processing unit 110 carries out the process defined by S3011.

Figure 9:
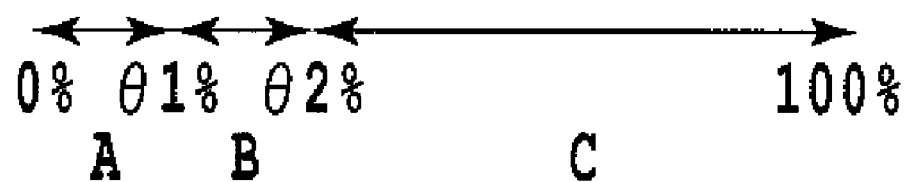
FIG. 9 illustrates an example for carrying out the control of the total amount of toner while using the amount of toner in the K plate as a standard.

At S3011, if the amount of toner of the K plate of the target pixels is within the predetermined range; i.e., "θ1< the amount of toner of the K plate of the target pixels<=θ2"; the process A is carried out at S3013. Contrarily, if it is not "θ1< the amount of toner of the K plate of the target pixels<=θ2", the image-deformation processing unit 110 carries out the process defined by S3012. Here, θ1 and θ2 may be any values within in a range from 0% to 100% as shown in FIG. 9. 100% means 255 when pixel data is represented by 8 bits. Note that θ1 and θ2 may be either set by a maintenance staff through a maintenance console or stored in the storage unit 104 when the image-forming apparatus is assembled in a factory.

The image-deformation processing unit 110 carries out the process B if "θ2< the amount of toner of the K plate of the target pixels" at S3012, and carries out the process C if it is not if "θ2< the amount of toner of the K plate of the target pixels" at S3015.

Next, the contents of the above-mentioned processes A, B and C will be described with reference to the drawings.

First, the process A will be explained. For the purpose of the convenience for the description, the limit value of the total amount of toner is defined as 200%.

Figure 4:
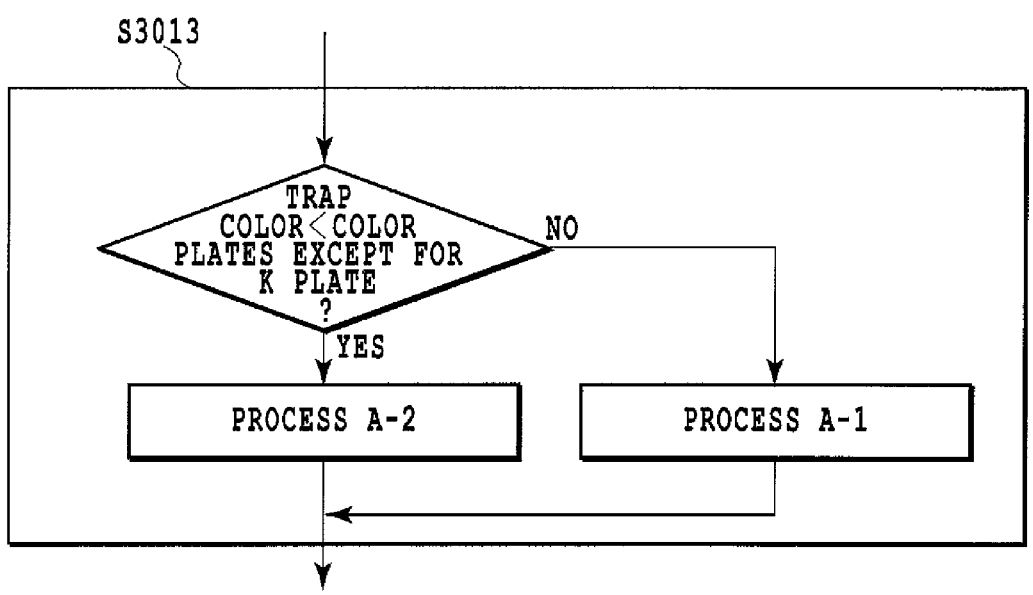
FIG. 4 illustrates a process A in FIG. 3A.
Figure 6:
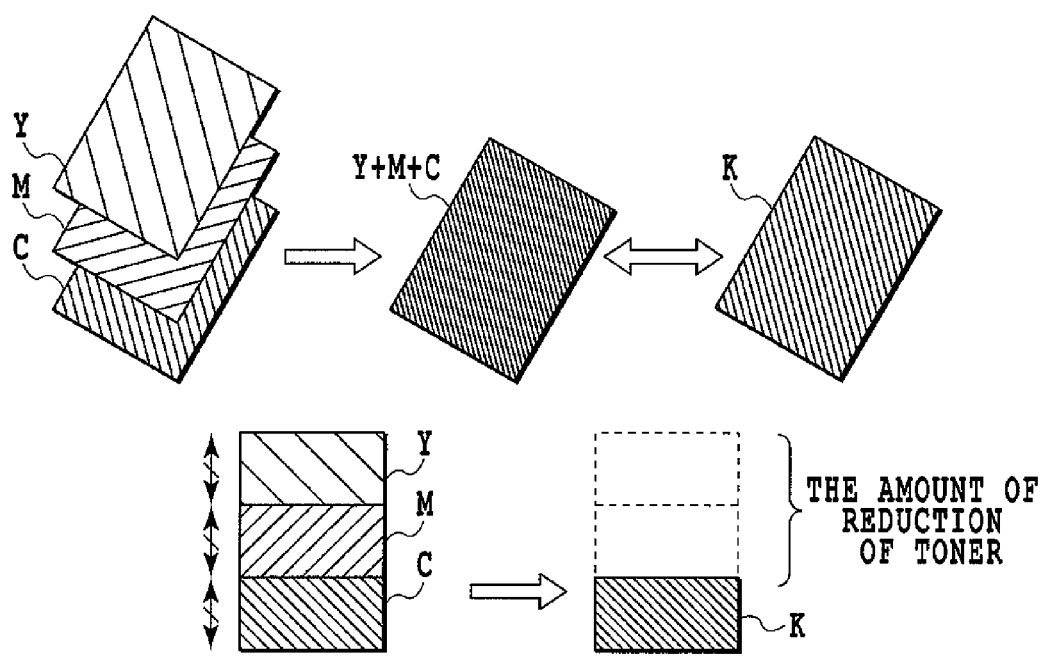
FIG. 6 illustrates the toner reduction.
Figure 7:
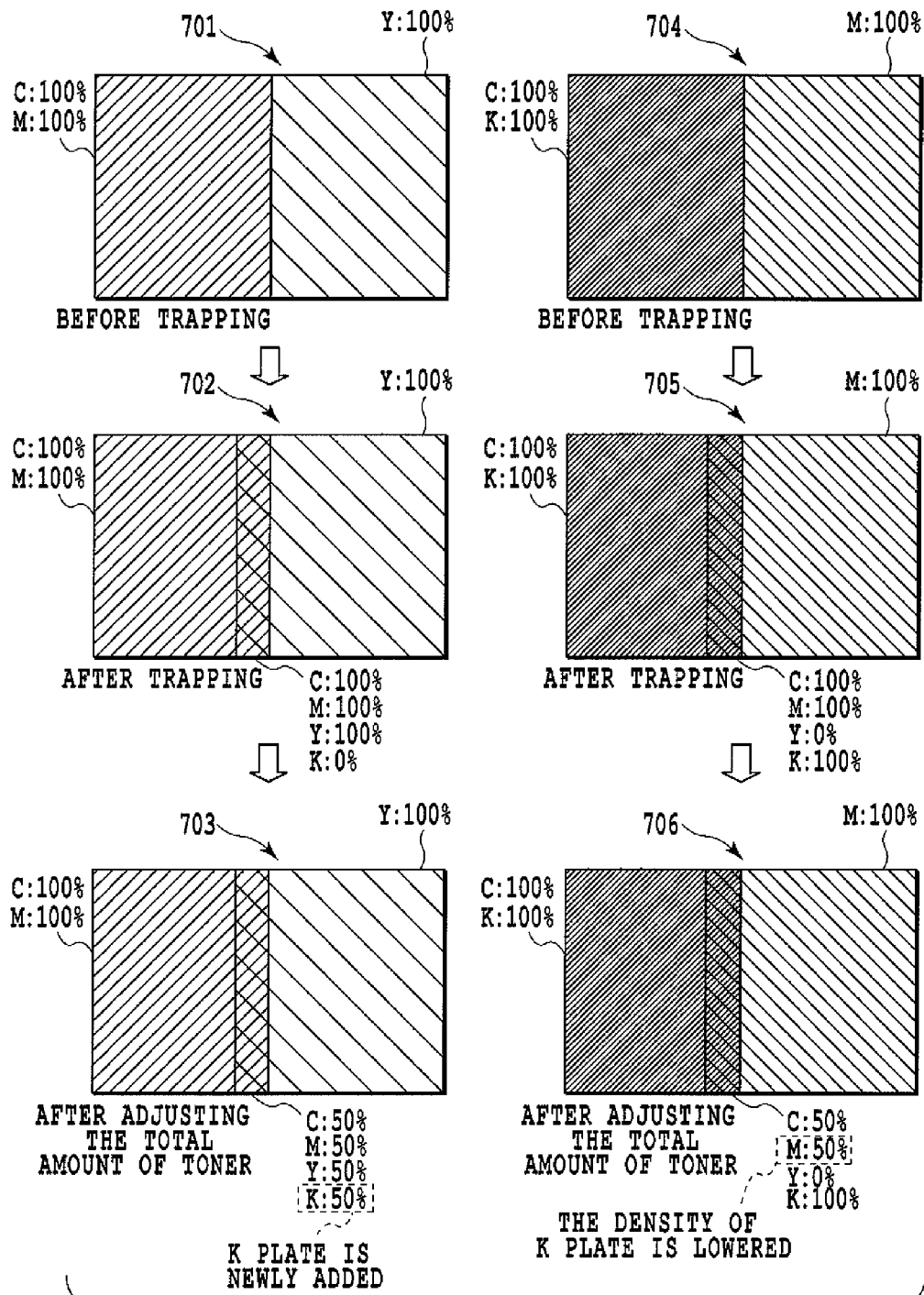
FIG. 7 illustrates the conventional mechanism for reducing the total amount of toner.
Figure 8A:
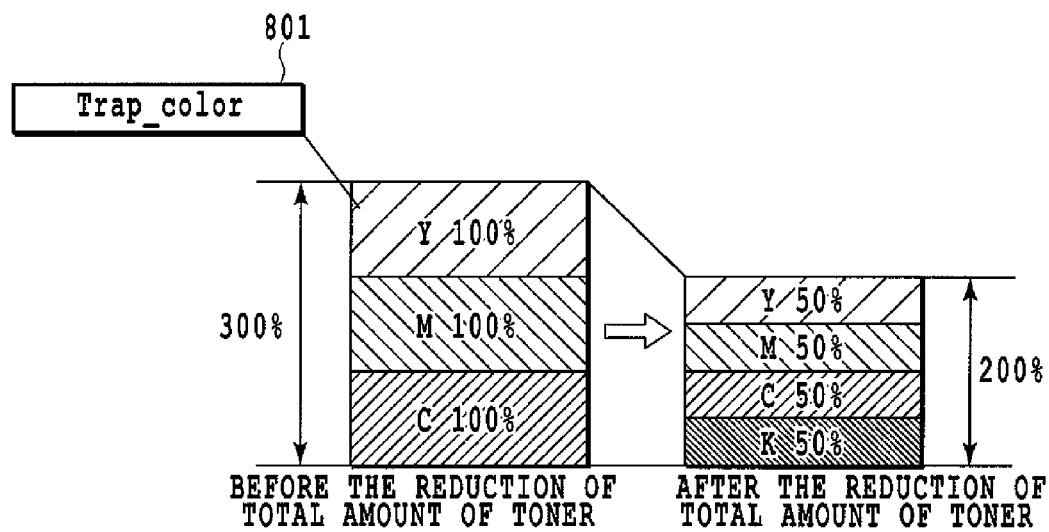
FIG. 8A illustrates the constitution of the color plates before and after the reduction of the total amount of toner when the conventional method for reducing the total amount of toner is used.
Figure 8B:
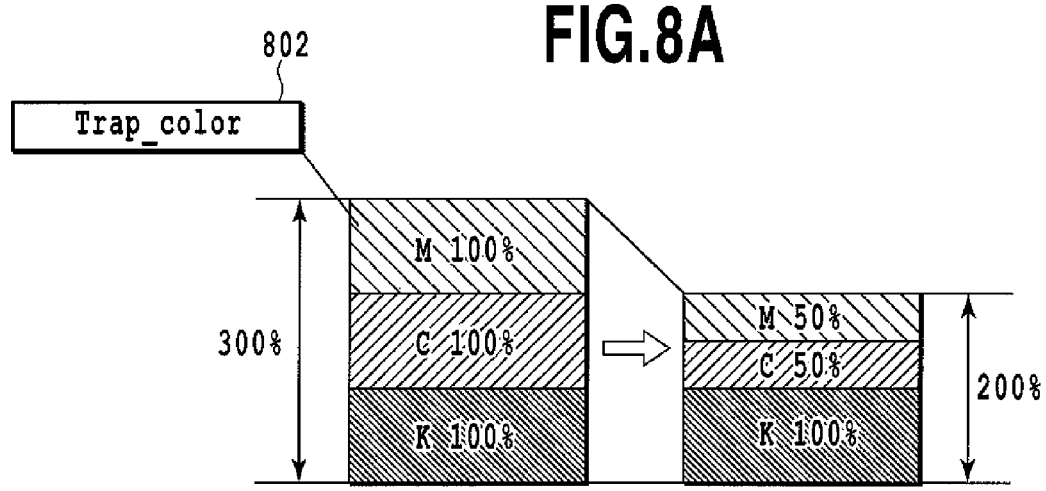
FIG. 8B illustrates the constitution of the color plates before and after the reduction of the total amount of toner when the conventional method for reducing the total amount of toner is used.

FIG. 4 illustrates the content of the process A shown in FIG. 3A. In the process A, the image-deformation processing unit 110 compares the amount of toner of the trap color with those in the color plates except for the K plate and the trap color, and in accordance with the results thereof, carries out either the process A-1 or A-2. Here, when the trap color is the M plate, the color plates except for the K plate and the trap color (hereinafter referred to as the color plates except for the K plate) are the C plate and the Y plate.

When the amount of toner of the trap color is more than those in the color plates except for the K plate, the image-deformation processing unit 110 carries out the following calculation and determines C', M', Y' and K' (the process A-1).

Here, C', M', Y' and K' represent the amount of toner in the C, M, Y and K plates, respectively, after the total amount of toner has been reduced.

If the amount of reduction of toner is T and the amount of toner of the C, M and Y plates is replaced with the amount of the K plate using UCR (Under Color Removal), the following equations are obtained.

$C'=C-T,$ $M'=M-T,$ $Y'=Y-T,$ and $K'=K+T.$ where $K'<=100,$ $C'+M'+Y'+K'=C+M+Y+K-2T,$ $C'+M'+Y'+K'=$Limit (the limit of the total amount of toner), and $C+M+Y+K=$Total (the total amount of toner for the target pixels).

Accordingly, the following equation is obtained.

$T=($Total$-$Limit$)/2$

Since the amount of reduction of toner is needed to be greater or equal to the amount of toner in the color plate except for the K plate, which has the minimum amount of toner, the following equation is obtained.

(Total$-$Limit)/2>(the minimum amount of toner in the color plate except for the K plate)

Furthermore, the value obtained by adding T and the amount of toner for the K plate needs to be less or equal to the maximum amount of toner (100%) in the K plate.

Accordingly, the following equation is obtained.

$K+($Total$-$Limit$)/2<=100\%$

On the basis that the condition described by the above equation is satisfied, the amount of toner in the C, M, Y and K plates, respectively, are reduced by using the following equations:

$C'=C-a\times$min, $M'=M-b\times$min, $Y'=Y-c\times$min, and $K'=K+d\times$min.

where

C, M, Y and K: the amount of toner in the C, M, Y and K plates, respectively, before the reduction of the total amount of toner;

Total: the total amount of toner of the target pixels;

(Total$=C+M+Y+K$);

Limit: the limit value of the total amount of toner;

min: the minimum amount of toner in C, M and Y; and $(a+b+c-d)$min$=2T, (C'+M'+Y'+K'=C+M+Y+K-2T)$.

In this regard, θ1 shown in FIG. 9 is preferably determined so that $K+($Total$-$Limit$)/2<=100\%$ is not materialized in the process A.

According to the process A-1, the total amount of toner can be reduced by increasing the amount of toner in the K plate while reducing the amount of toner in the color plates except for the K plate.

The above-mentioned constitution gives the effect of reducing the amount of toner under the condition that the color plate having the minimum amount toner among the C, M and Y plates does not disappear while the amount of toner for the K plate is less or equal to the maximum amount of toner (100%) in the K plate. In addition, since the amount of toner for the trap color is more than the amount of toner in the color plates except for the K plate, the toner for the trap color sufficiently remains even if the amount of toner is reduced using the above T. Accordingly the purpose of the trapping is achieved to a satisfactory extent even if the poor printing alignment occurs.

On the other hand, when the amount of toner of the trap color is less than the amount of toner in the color plates except for the K plate, the image-deformation processing unit 110 carries out the following calculation to obtain C', M', Y' and K' (the process A-2).

When (Total$-$Limit)/2<=(the minimum amount of toner in the color plates except for the K plate) and $K+($Total$-$Limit$)/2<=100$ are satisfied, the amount of toner in the C plate, the M plate and the Y plate are reduced by using the following equations:

$C'=C-($Total$-$Limit$)\times(\alpha\times C/$Total$),$ $M'=M-($Total$-$Limit$)\times(\beta\times M/$Total$),$ $Y'=Y-($Total$-$Limit$)\times(\gamma\times Y/$Total$),$ and $K'=K,$ where C, M, Y and K: the amount of toner in the C, M, Y and K plates before the total amount of toner is reduced;

Total: the total amount of toner of the target pixels (Total$=C+M+Y+K$);

Limit: the limit value of the total amount of toner, and $\alpha+\beta+\gamma=1.$ α, β and γ are coefficients variable in accordance with the characteristics of the color plate of the trap color or the copying machine (for example, the maximum output amount of toner of each the color plate maybe different from the other in the respective copying machine).

Regarding the setting of the values α, β and γ, the minimum amount of toner of the color plates except for the K plate is used as a conversion amount.

By the execution of the process A-2, the total amount of toner can be reduced so that the toner for the trap color is not run down even if the amount of toner for the trap color is less or equal to the amount of toner in the color plates except for the K plate.

Then, the process B will be described. The process B is executed when the amount of toner in the K plate is comparatively large in amount. In this case, with regard to the image before reducing the amount of toner, the control of the amount of toner in the K plate having a great impact on density is suppressed in order to prevent the density after reducing the amount of toner from changing. Furthermore, the reduction of the amount of toner for the trap color is suppressed so that the effect of the trapping can be obtained when the poor printing alignment occurs.

In the process B, the brightness is obtained using a look-up table for converting the CMYK values to the Lab values, and the following calculation is executed to determine C', M', Y' and K'.

$$C'=C-(Total-Limit) \times \alpha \times L(c)/[L(c)+L(m)+L(y)],$$

$$M'=M-(Total-Limit) \times \beta \times L(c)/[L(c)+L(m)+L(y)],$$

$$Y'=Y-(Total-Limit) \times \gamma \times L(c)/[L(c)+L(m)+L(y)], \text{ and}$$

$$K'=K.$$

Note that C', M', Y' and K' may be obtained by the following calculation while replacing the brightness of the respective color plate with the amount of toner thereof.

$$C'=C-(Total-Limit) \times \alpha \times C/Total,$$

$$M'=M-(Total-Limit) \times \beta \times M/Total,$$

$$Y'=Y-(Total-Limit) \times \gamma \times Y/Total, \text{ and}$$

$$K'=K.$$

where
C, M, Y and K: the amount of toner in the C, M, Y and K plates, respectively, before the total amount of toner is reduced,
Total: the total amount of toner of the target pixels,
Limit: the limit value of the total amount of toner,
L(i): the L value of the target pixels in the i plate, and $$\alpha+\beta+\gamma=1.$$

α, β and γ are coefficients set to be changeable while taking the type of the color plate having the trap color or the conditions of the copying machine into account.

FIGS. 11A to 11F illustrate the constitution of the color plates before and after the reduction of the total amount of toner according to the second embodiment.

Figure 11A:
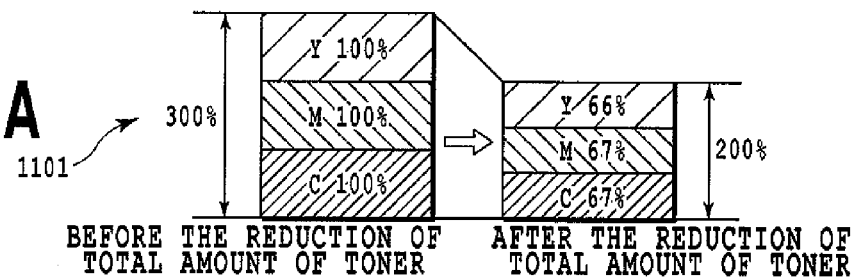
FIG. 11A illustrates the constitution of the color plates before and after the reduction of the total amount of toner when the total amount of toner is adjusted by a second embodiment of the present invention.
Figure 11B:
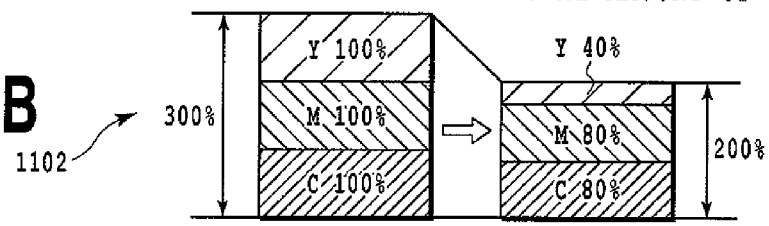
FIG. 11B illustrates the constitution of the color plates before and after the reduction of the total amount of toner when the total amount of toner is adjusted by a second embodiment of the present invention.
Figure 11C:
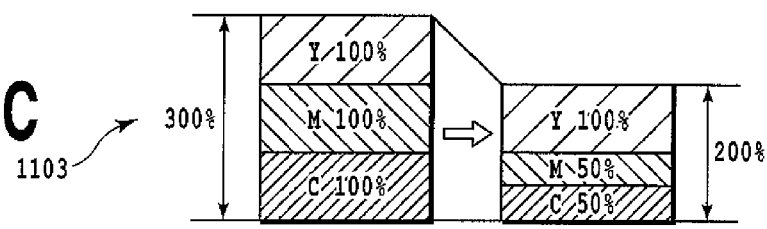
FIG. 11C illustrates the constitution of the color plates before and after the reduction of the total amount of toner when the total amount of toner is adjusted by a second embodiment of the present invention.
Figure 11D:
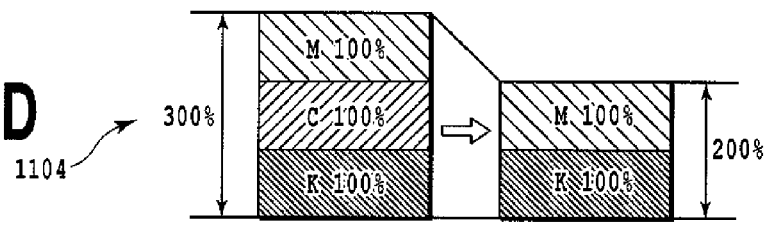
FIG. 11D illustrates the constitution of the color plates before and after the reduction of the total amount of toner when the total amount of toner is adjusted by a second embodiment of the present invention.
Figure 11E:
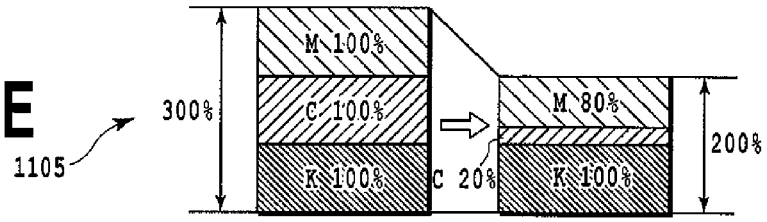
FIG. 11E illustrates the constitution of the color plates before and after the reduction of the total amount of toner when the total amount of toner is adjusted by a second embodiment of the present invention.
Figure 11F:
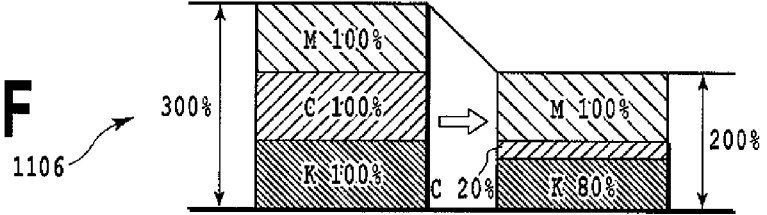
FIG. 11F illustrates the constitution of the color plates before and after the reduction of the total amount of toner when the total amount of toner is adjusted by a second embodiment of the present invention.

As shown in 1104, 1105 and 1106 in FIGS. 11D to 11F, the constitution of the amount of toner in the respective color plates before the reduction of the total amount of toner is in that the C plate is 100%, the K plate is 100% and the M plate having the trap color is 100%.

When (α, β, γ)=(1, 0, 0) is set, the constitution of the amount of toner in the respective color plates after the reduction of the total amount of toner is in that the M plate is 100% and the K plate is 100% (case 1).

When (α, β, γ)=(0.8, 0.2, 0) is set, the constitution of the amount of toner in the respective color plates after the reduction of the total amount of toner is in that the M plate is 80%, the C plate is 20% and the K plate is 100% (case 2).

When (α, β, γ)=(1, 0, 0) is set and the K plate is reduced, the constitution of the amount of toner in the respective color plates after the reduction of the total amount of toner is in that the M plate is 100%, the C plate is 20% and the K plate is 80% (case 3).

By lowering the reduction rate of the K plate and the M plate having the trap color in all of the cases 1 to 3, the following two effects are resulted.

A first effect is in that the deterioration of the image quality is suppressed after the trapping. A second effect is in that the trap color appears as desired when the poor printing alignment occurs whereby the white line is prevented from generating.

Accordingly, in the second embodiment, since the reduction rate of the C plate except for the M plate having the trap color and the K plate is in a range from 0.8 to 1.0, the reduction rate of the amount of toner in the C plate is significant.

Then the process C will be described. The process C is executed when the amount of toner in the K plate is small in amount or zero. As discussed in the section of the background of the invention, if the amount of toner in the K plate is increased, the K plate originally nonexistent is generated. Accordingly, the amount of toner in the K plate should not be controlled. Therefore, the amount of toner for the trap color is solely adjusted. Note that the amount of toner should be reduced to the extent that the toner for the trap color is not run down.

In the process C, only the amount of toner of the color plates is reduced with the amount of toner in the K plate of the target pixels kept.

In this case, the amount of toner in the C, M and Y plates are reduced by using the following equations:

$$C'=C-(Total-Limit) \times \alpha \times L(c)/[L(c)+L(m)+L(y)],$$

$$M'=M-(Total-Limit) \times \beta \times L(c)/[L(c)+L(m)+L(y)],$$

$$Y'=Y-(Total-Limit) \times \gamma \times L(c)/[L(c)+L(m)+L(y)], \text{ and}$$

$$K'=K.$$

where α+β+γ=1 is satisfied.

In the process C, it is desired that θ2 in FIG. 9 is determined so that the change in brightness can be small according to the above equations.

Also, C', M', Y' and K' may be obtained by the following equations while replacing the brightness of the respective color plate with the amount of toner thereof.

$$C'=C-(Total-Limit) \times \alpha \times C/Total,$$

$$M'=M-(Total-Limit) \times \beta \times M/Total,$$

$$Y'=Y-(Total-Limit) \times \gamma \times Y/Total, \text{ and}$$

$$K'=K.$$

where α+β+γ=1 is satisfied.

α, β and γ are coefficients set to be changeable while taking the type of the color plate having the trap color or the conditions of a printer body such as a copying machine into account.

The constitution of the color plates before and after the reduction of the total amount of toner will be described with reference to FIGS. 11A to 11F again.

As shown by 1101, 1102 and 1103 in FIGS. 11A to 11C, the constitution of the amount of toner of the target pixels before the reduction of the total amount of toner are in that the C plate is 100%, the M plate is 100% and the Y plate having the trap color is 100%.

When $(\alpha, \beta, \gamma)=(0.33, 0.33, 0.33)$ is set, the constitution of the amount of toner in the target pixels after the reduction of the total amount of toner becomes 66% in the Y plate, 67% in the M plate and 67% in the C plate (case 1).

When $(\alpha, \beta, \gamma)=(0.5, 0.25, 0.25)$ is set, the constitution of the amount of toner in the target pixels after the reduction of the total amount of toner becomes 40% in the Y plate, 80% in the M plate and 80% in the C plate (case 2).

When $(\alpha, \beta, \gamma)=(0, 0.5, 05)$ is set, the constitution of the amount of toner in the target pixels after the reduction of the total amount of toner becomes 100% in the Y plate, 50% in the M plate and 50% in the C plate (case 3).

Since the Y plate having the trap color is brighter than the C and M plates, $(\alpha, \beta, \gamma)=(0.5, 0.25, 0.25)$ is set when the reduction rate of the amount of toner in the Y plate is made larger than those in the C and M plates.

In general, the values of $\alpha$, $\beta$ and $\gamma$ are preferably designed so that the brightness of the pixels before trapping becomes approximately equal to that after the trapping. However, there are cases where it is desired that the target pixels have priority to the trap color (the case 2) or, contrarily, it is desired that the trap color have priority to the target pixels (the case 3) in accordance with the degrees of the registration adjustment in the respective color plates. In either of the cases 1 to 3, the effect is obtainable for suppressing the deterioration of the image quality after the trapping. Also, since the Y plate of the trap color is a bright color plate, another effect is obtained in that even if the while line generates, it is not remarkable.

Accordingly, in the above-mentioned example, the reduction rate of all the color plates is within a range from 0.5 to 0.

A third embodiment of the reduction process of the total amount of toner will be described with reference to the attached drawings.

Figure 3B:
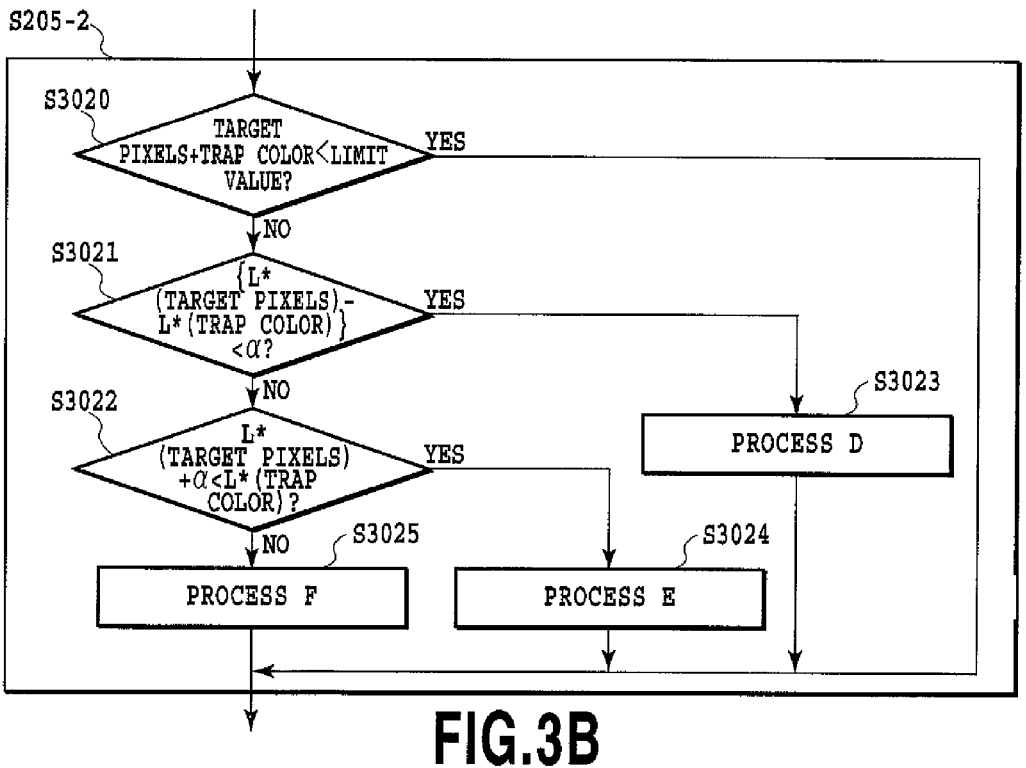
FIG. 3B is a flowchart illustrating in detail the process for adjusting the total amount of toner of the trap.

S205-2 in FIG. 3B is a flowchart illustrating in detail the process (S205 in FIG. 2) for adjusting the total amount of toner in the trap.

At S3020, it is determined whether or not the sum of the amount of toner of the trap color calculated at S204 and that of the target pixels exceeds the limit value of the total amount of toner. If the sum of the amount of toner of the trap color and the amount of toner of the target pixels exceeds the limit value, the image-deformation processing unit 110 executes the process defined at S3021. On the contrary, if the sum of the amount of toner of the trap color and the amount of toner of the target pixels does not exceed the limit value, the process is finished.

At S3021, the image-deformation processing unit 110 compares the brightness of the target pixels with that of the trap color, and determines whether or not the difference between the both is smaller than a predetermined value $\alpha$. That is, the image-deformation processing unit 110 determines whether or not the brightness of the target pixels is approximately equal to that of the trap color. Note that the brightness of the trap color and that of the target pixels are represented by L*(trap color) and L*(target pixels). When the brightness of the target pixels and that of the trap color are approximately equal to each other, the image-deformation processing unit 110 executes the process D (S3023). On the contrary, if both are not approximately equal to each other, the process defined at S3022 is carried out.

At S3022, it is determined whether or not the trap color is brighter than the target pixels, and if the trap color is brighter than the target pixels, the process E is executed (S3024). Contrarily, if the trap color is not brighter than the target pixels, the process F is executed (S3025).

In the above-mentioned example, while the brightness of the target pixels is compared with that of the trap color, the amount of toner of the target pixels and the trap color may be compared with each other.

Then, the contents of the above-mentioned processes D, E and F will be described below with reference to the drawing.

Figure 12A:
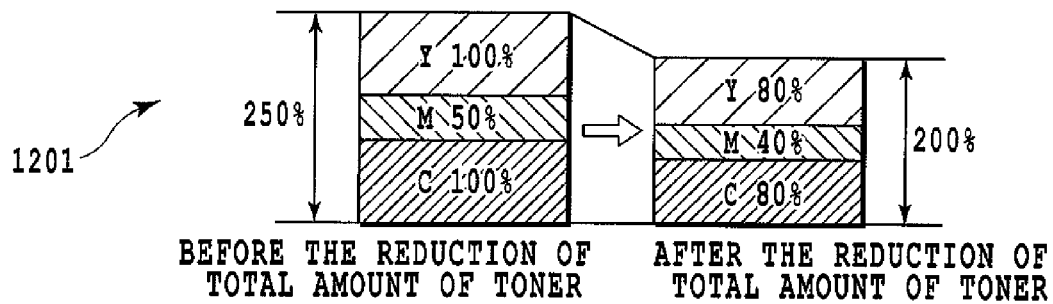
FIG. 12A illustrates the constitution of the color plates before and after the reduction of the total amount of toner when the total amount of toner is adjusted by a third embodiment of the present invention.
Figure 12B:
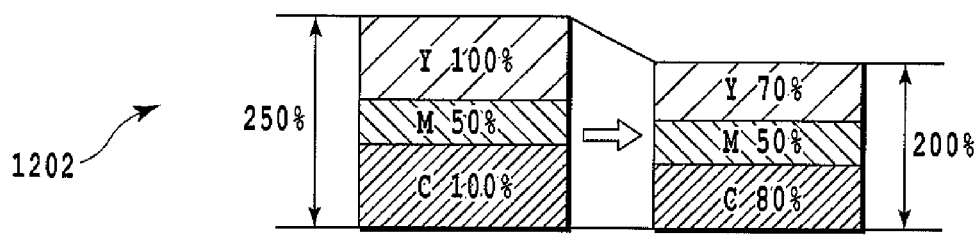
FIG. 12B illustrates the constitution of the color plates before and after the reduction of the total amount of toner when the total amount of toner is adjusted by a third embodiment of the present invention.
Figure 12C:
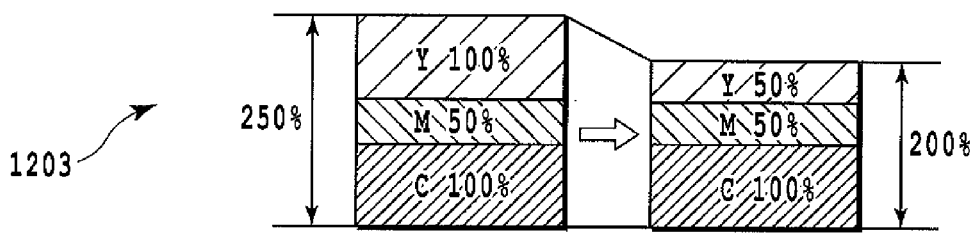
FIG. 12C illustrates the constitution of the color plates before and after the reduction of the total amount of toner when the total amount of toner is adjusted by a third embodiment of the present invention.

FIGS. 12A to 12C illustrate the constitution of the color plates before and after the reduction of the total amount of toner when the total amount of toner is adjusted according to the third embodiment.

First, the description is made on the process D.

In the process D, the image-deformation processing unit 110 carries out the following calculation for determining C', M', Y' and K' where C', M', Y' and K' represent the amount of toner of the C, M, Y and K plates, respectively, after the reduction of the total amount of toner.

$C'=C \times \text{Limit/Total}$, $M'=M \times \text{Limit/Total}$, $Y'=Y \times \text{Limit/Total}$, and $K'=Y \times \text{Limit/Total}$, where C, M, Y and K: the amount of toner in the C, M, Y and K plates, respectively, before the reduction of the total amount of toner, Total: the total amount of toner of the target pixels, $(\text{Total}=C+M+Y+K)$ and Limit: the limit value of the total amount of toner.

As shown in 1201 of FIG. 12A, the constitution of the amount of toner in the respective color plates before the reduction of the total amount of toner is 100% in the C plate, 50% in the M plate and 100% in the Y plate. By executing the process D, the constitution of the amount of toner in the respective color plates after the reduction of the total amount of toner becomes 80% in the C plate, 40% in the M plate and 80% in the Y plate. That is, by executing the process D, the amount of toner in the respective color plates is uniformly reduced at the same reduction rate. In this example, the amount of toner in the respective color plates is reduced at 20%.

Next, the process E will be described.

In the process E, the image-deformation processing unit 110 carries out the following calculation.

Namely, with the amount of toner in the color plate having a minimum amount of toner among a plurality of color plates of the target pixels kept, the amount of toner in the other color plates is reduced.

$X'=(\text{Total}-(\text{Limit}-X))/N$: condition A, and $X'=0$: condition B, where condition A indicates the amount of reduction of toner in the color plates, condition B indicated the amount of reduction of toner in the color plate having the minimum amount of toner among the color plates, and N indicates the number of the color plates under condition A.

Condition B does not originally exist or a color plate having extremely faint color is not object of the reduction.

FIG. 9 shows the amount of toner in the K plate. By defining θ1, θ2, B and C areas become object of the reduction of toner.

The amount of toner after the reduction of the amount of toner is as follows;

$$C'=C-X'$$

$$M'=M-X'$$

$$Y'=Y-X'$$

$$K'=K-X'$$

As shown in 1202 of FIG. 12B, the constitution of the amount of toner in the respective color plates before the reduction of the total amount of toner is 100% in the C plate, 50% in the M plate and 100% in the Y plate. By executing the process E, the constitution of the amount of toner in the respective color plates after the reduction of the total amount of toner becomes 80% in the C plate, 50% in the M plate and 70% in the Y plate.

Next, the process F will be described.

In the process F, the image-deformation processing unit 110 carries out the following calculation. Namely, the image-deforming processing unit 110 reduces only the amount of toner for the trap color.

$$X'=\text{Total}-\text{Limit: condition A, and}$$

$$X'=0: \text{condition B,}$$

where condition A indicates the amount of reduction of toner in the color plate which is the trap color, and condition B indicated the amount of reduction of toner in the color plates which are not the trap color.

In that regard, the amount of toner after the reduction of the amount of toner is as follows:

$$C'=C-X'$$

$$M'=M-X'$$

$$Y'=Y-X'$$

$$K'=K-X'$$

As shown in 1203 of FIG. 12C, the constitution of the amount of toner in the respective color plates before the reduction of the total amount of toner is 100% in the C plate, 50% in the M plate and 100% in the Y plate. By executing the process F, the constitution of the amount of toner in the respective color plates after the reduction of the total amount of toner becomes 100% in the C plate, 50% in the M plate and 50% in the Y plate. That is, the amount of toner of the Y plate having the trap color is set not to exceed a minimum amount of toner (the C plate: 50%).

One of the above-mentioned three methods is selected in accordance with the following conditions.

As described above, according to the third embodiment, if the brightness of the target pixels is approximately equal to that of the trap color, the process D is executed; if the trap color is brighter than the target pixels, the process E is executed; and if the target pixels are brighter than the trap color, the process F is executed.

The present invention may be embodied as a system, a device, a method, a computer program or a computer-readable recording medium. Also, the present invention is applicable to a system composed of a plurality of equipments or a single apparatus.

Embodiments of the present invention include that the computer program performing the above-mentioned functions of the present invention is supplied to the system or the apparatus, and that the computer provided in the system or the apparatus executes the computer program. The recording medium is a computer-readable medium. Accordingly, in the embodiments, the computer program for performing the functions of the present invention is included. The computer program includes object codes, programs executed by an interpreter, and/or computer-executable commands such as script data supplied to OS. The recording medium may be a floppy disk (registered trade name), a hard disk, an optical disk, a magnetic-optical disk, MO, CD-ROM, CD-R, CD-RW, a magnetic tape, a non-volatile memory card, ROM, DVD or others. The program may be downloaded from the Internet by using a browser of a client's computer to the recording medium such as a hard disk. In this method, a file of the computer program or a compressed file containing an automatic installing function is downloaded from Internet. Also, in the embodiments, a method is included where the program codes constituting the computer program are divided to a plurality of files and each of the files is downloaded from different servers. Also, in the embodiments, a server is included for downloading files of the computer program to a plurality of users.

If the computer program is executed by the computer, the above-mentioned functions of the embodiments are achievable. Also, if the OS or other programs operating on the computer executes part or all of the actual processes, the above-mentioned functions of the embodiments are achievable.

Even after the computer program read from the recording medium has been written in a memory provided with a functionality-expansion board inserted into the computer or a functionality-expansion unit connected to the computer, the above-mentioned functions of the embodiments are obtainable. That is, if the CPU provided in the functionality-expansion board or the functionality-expansion unit carries out part or all of the actual processes based on commands from the computer program, the above-mentioned functions of the embodiments are obtainable.

The present invention has been described in detail with respect to preferred embodiments, and it will now be apparent from the foregoing to those skilled in the art that changes and modifications may be made without departing from the invention in its border aspect, and it is the intention, therefore, in the appended claims to cover all such changes.

This application claims priority from Japanese Patent Application No. 2006-339955 filed Dec. 18, 2006 and Japanese Patent Application No. 2007-297267 filed Nov. 15, 2007, which are hereby incorporated by reference herein.

What is claimed is:

1. An image processing method comprising:
a determination step of determining whether or not to carry out trapping for target pixels;
a trapping toner total amount determination step of determining whether or not a total amount of toner after the trapping exceeds a limit value; and
a toner amount reducing step of reducing, if it is determined by the trapping toner total amount determination step that the total amount of toner after the trapping exceeds a limit value, the total amount of toner,
wherein the toner amount reducing step maintains the amount of toner of a black color plate of the target pixels and reduces the amount of toner of color plates of the target pixels other than the black color plate.

2. The image processing method of claim 1, wherein the color plates other than the black color plate are cyan, magenta, and yellow.

3. The image processing method of claim 1, wherein the target pixels are pixels obtained by scanning through a scanner or pixels according to PDL data received from an external device.

4. An image processing apparatus comprising:
   a determination unit configured to determine whether or not to carry out trapping for target pixels;
   a trapping toner total amount determination step of determining whether or not a total amount of toner after the trapping exceeds a limit value; and
   a toner amount reducing unit configured to reduce, if it is determined by the trapping toner total amount determination step that the total amount of toner after the trapping exceeds a limit value, the total amount of toner,
   wherein the toner amount reducing unit maintains the amount of toner of a black color plate of the target pixels and reduces the amount of toner of color plates of the target pixels other than the black color plate.

5. The image processing apparatus of claim 4, wherein the color plates other than the black color plate are cyan, magenta, and yellow.

6. The image processing apparatus of claim 4, wherein the target pixels are pixels obtained by scanning through a scanner or pixels according to PDL data received from an external device.

7. A non-transitory computer-readable recording medium having computer-executable instructions for performing a method, the method comprising:
   a determination step of determining whether or not to carry out trapping for target pixels;
   a trapping toner total amount determination step of determining whether or not a total amount of toner after the trapping exceeds a limit value; and
   a toner amount reducing step of reducing, if it is determined by the trapping toner total amount determination step that the total amount of toner after the trapping exceeds a limit value, the total amount of toner,
   wherein the toner amount reducing step maintains the amount of toner of a black color plate of the target pixels and reduces the amount of toner of color plates of the target pixels other than the black color plate.

* * * * *